(12) United States Patent
Aschwanden et al.

(10) Patent No.: US 12,496,791 B2
(45) Date of Patent: Dec. 16, 2025

(54) RAPID PROTOTYPING OF OPTICAL COMPONENTS, PARTICULARLY LENSES, FOR PRODUCING CUSTOMIZED OPTICAL SURFACE SHAPES

(71) Applicant: OPTOTUNE SWITZERLAND AG, Dietikon (CH)

(72) Inventors: Manuel Aschwanden, Allenwinden (CH); David Andreas Niederer, Küttigen (CH); Roman Patscheider, Winterthur (CH); Michael Zihlmann, Dietikon (CH); Christopher Laning, Windisch (CH); Marta Vidiella Del Blanco, Dietikon (CH)

(73) Assignee: OPTOTUNE SWITZERLAND AG, Dietikon (CH)

( * ) Notice: Subject to any disclaimer, the term of this patent is extended or adjusted under 35 U.S.C. 154(b) by 239 days.

(21) Appl. No.: 17/998,676

(22) PCT Filed: May 12, 2021

(86) PCT No.: PCT/EP2021/062687
§ 371 (c)(1),
(2) Date: Nov. 14, 2022

(87) PCT Pub. No.: WO2021/228976
PCT Pub. Date: Nov. 18, 2021

(65) Prior Publication Data
US 2023/0347604 A1     Nov. 2, 2023

(30) Foreign Application Priority Data
May 12, 2020    (DE) ............. 10 2020 112 843.6

(51) Int. Cl.
B29D 11/00    (2006.01)

(52) U.S. Cl.
CPC .. B29D 11/00134 (2013.01); B29D 11/00557 (2013.01)

(58) Field of Classification Search
None
See application file for complete search history.

(56) References Cited

U.S. PATENT DOCUMENTS

| | | | |
|---|---|---|---|
| 3,938,775 A * | 2/1976 | Sarofeen ......... | B29D 11/00538 249/102 |
| 4,447,372 A * | 5/1984 | Kreuttner ........... | B29C 45/37 425/808 |

(Continued)

FOREIGN PATENT DOCUMENTS

| | | |
|---|---|---|
| EP | 3757627 | 12/2020 |
| JP | 2004025858 | 1/2004 |

(Continued)

*Primary Examiner* — Emmanuel S Luk
(74) *Attorney, Agent, or Firm* — JMB Davis Ben-David

(57) ABSTRACT

The present invention relates to a method for producing at least one optical component (1), comprising the steps of: a) Providing at least one cavity (2), wherein the at least one cavity (2) is delimited on a first side by a surface (3a) of a first membrane portion (3), wherein a shape of the first membrane portion (3) is adjustable; b) Filling a material (4) into the at least one cavity (2) for forming at least one optical component (1), such that the material (4) contacts a surface (3a) of the first membrane portion (3); c) Adjusting the shape of the first membrane portion (3); d) Curing the material (4) filled into the at least one cavity (2) so that the material (4) forms a first interface (e.g. a first optical surface) (1a) of the at least one optical component (1), which first interface (1a) comprises a shape defined by a shape of the surface (3a) of the first membrane portion (3).

30 Claims, 9 Drawing Sheets

(56) References Cited

U.S. PATENT DOCUMENTS

| | | | |
|---|---|---|---|
| 6,319,433 B1 | 11/2001 | Kohan | |
| 7,402,032 B2 * | 7/2008 | Tu | B29C 33/3842 |
| | | | 264/1.32 |
| 2004/0211222 A1 | 10/2004 | Hosoe | |
| 2005/0264756 A1 | 12/2005 | Esch | |
| 2007/0296095 A1 | 12/2007 | Griffith | |
| 2009/0256977 A1 * | 10/2009 | Haddock | G02F 1/1339 |
| | | | 156/60 |
| 2012/0218455 A1 * | 8/2012 | Imai | G02B 13/001 |
| | | | 348/340 |
| 2017/0235157 A1 | 8/2017 | Padiou et al. | |

FOREIGN PATENT DOCUMENTS

| | | |
|---|---|---|
| JP | 2007245515 | 9/2007 |
| JP | 2010204635 | 9/2010 |
| JP | 2013125059 | 6/2013 |
| JP | 2018531418 | 10/2018 |
| JP | 2019515327 | 6/2019 |
| WO | 2013056380 | 4/2013 |
| WO | 2019140036 | 7/2019 |

* cited by examiner

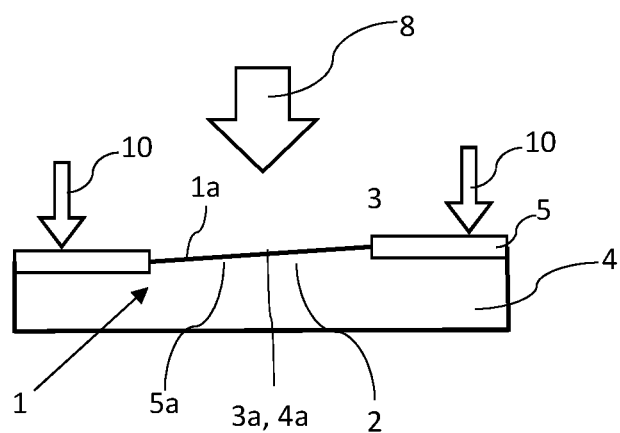
Fig. 10
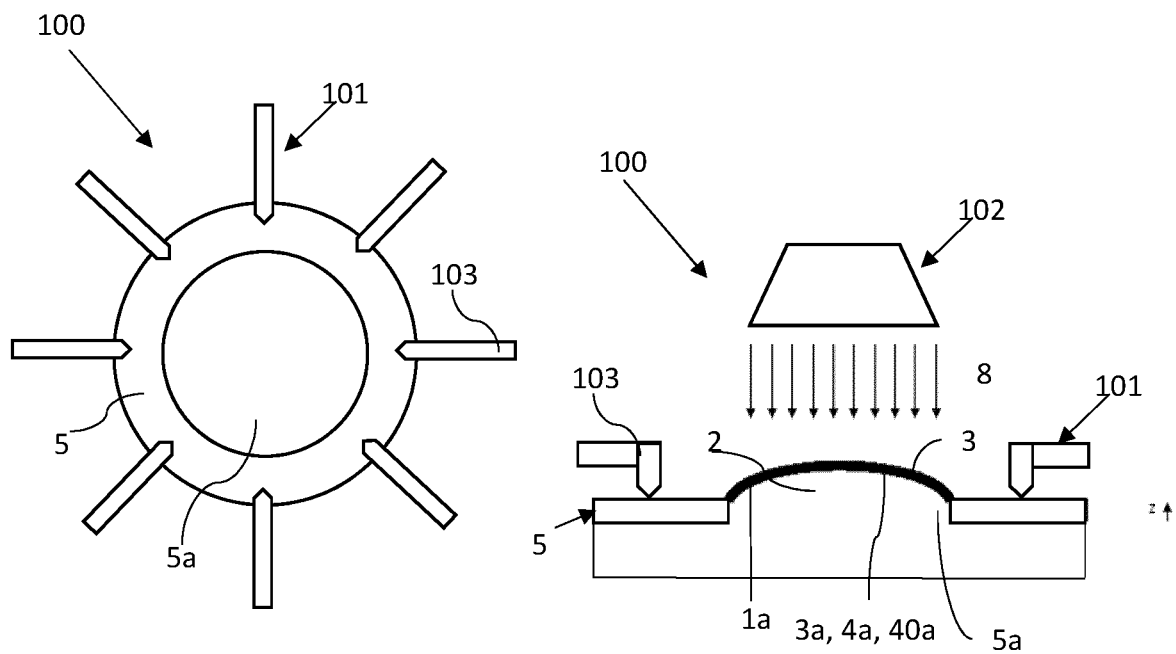
Fig. 11
Fig. 12

RAPID PROTOTYPING OF OPTICAL COMPONENTS, PARTICULARLY LENSES, FOR PRODUCING CUSTOMIZED OPTICAL SURFACE SHAPES

CROSS-REFERENCE TO RELATED APPLICATIONS

This is the U.S. National Stage of International Patent Application No. PCT/EP2021/062687 filed on May 12, 2021, which claims priority to German Patent Application No. 10 2020 112 843.6 filed on May 12, 2020.

The present invention relates to a method for producing at least one optical component. Furthermore, the invention relates to an optical device comprising at least one optical component produced using the method according to the present invention. Furthermore, the present invention relates to an optical device having a customized optical surface as well as to a device that can be used for conducting the method according to the present invention.

Regarding the manufacturing of optical components, particularly lenses, the difficulty often arises to shape the respective component in an efficient and sufficiently fast manner while ensuring a high optical quality at the same time. Particularly, using traditional molds is relatively slow, since such molds have a long lead time corresponding to the time span from defining the shape of the component to the completion of the component. Furthermore, well-established processes such as grinding/3D milling are relatively expensive and time consuming. Furthermore, rapid prototyping based on 3D printing is quick and cost efficient, but usually of minor quality particularly when applied to lenses.

Based on the above, the problem to be solved by the present invention is to provide a method that allows a relatively fast and cost-efficient manufacturing of optical components such as lenses while ensuring at the same time a sufficient optical quality.

The method for producing at least one optical component, comprises the steps of:
  a1) providing at least one cavity (2)
  b1) filling a liquid material (4) into the at least one cavity (2)
  c1) adjusting a shape of a first surface (4a) of the liquid material (4),
  d1) curing the liquid material (4) filled into the at least one cavity (2) so that the liquid material (4) becomes a rigid material (40) and the first surface (4a) becomes a first interface (40a), wherein a shape of the first interface (40a) is defined by the shape of the first surface (4a), and either
  e1) forming the at least one optical component by means of a molding process, wherein the first interface (40a) provides at least one surface of a molding tool and the shape of an optical surface of the optical component (1) is formed by means of the first interface (40a), or
  e2) the optical component comprises the rigid material (40) and the first interface (40a) is an optical surface of the optical component (1).

In method step a1) the at least one cavity is provided. Here and in the following, the cavity is a confined space, which is delimited by a single or multiple solid state structures. The solid state structures may be elastically deformable, wherein the deformation of the solid state structures is controllable. Thus, the shape of the cavity may be adjustable. The cavity is arranged to carry a liquid. The cavity may be arranged to delimit the liquid completely on all sides. In particular, the cavity is sealed in a liquid tight fashion. Alternatively, the cavity may be open, to enable a flow of the liquid through the cavity. For example, the cavity comprises a valve, which is arranged to control a flow of the liquid in and out of the cavity. The cavity may be arranged to move the liquid within the cavity in a predefined manner by pumping, by convection or by tilting or rotating the cavity.

In method step b1) the liquid material is filled into the at least one cavity. Here and in the following, the liquid material has a maximum viscosity of 100000 mPa s, preferably a maximum viscosity of 1000 mPa s, and highly preferred a maximum viscosity of 100 mPa s. The cavity is arranged to delimit the liquid material on at least one side. According to a first alternative, the cavity may be completely filled with the liquid material. According to a second alternative, the cavity is partially filled with the liquid material and additionally the cavity is filled with a fluid (gaseous or liquid) wherein the fluid and the liquid material are immiscible or have different densities. Thus, the liquid material and the fluid are separated within the cavity.

According to one embodiment, the liquid material may be provided on a carrier, wherein in method step b1) the carrier is arranged in the cavity, or the solid state structures delimiting the cavity comprise said carrier. In particular, the liquid material is arranged on a face of the carrier, wherein the face is curved, comprises nano-structures, comprises protrusions and/or comprises recesses. In particular, the carrier is a wafer, preferably comprising silicon, ceramic or glass.

In particular, the cavity is open on a further side and at the further side, the liquid material is adjacent to a fluid (gaseous or liquid) material. In particular, the fluid material may be at ambient pressure.

A reservoir comprising the liquid material may be connected to the cavity. The cavity may comprise an opening through which the liquid material flows in and out of the cavity. In particular, the flow of the liquid material in the cavity may be controlled continuously. In particular, the liquid material us pumped to circulate the liquid material within the cavity or flow the liquid material through the cavity, wherein the motion the liquid material exceeds convectional flow.

In a method step b2), which is performed after method step b1), the cavity may be closed. Thus, an opening through which the liquid material is filled into the cavity may be closed. In particular, the cavity is closed by arranging a flexible membrane on a first surface formed by the liquid material, wherein the flexible membrane adjoins the liquid material. For example, the cavity may be closed by curing a sub region of the liquid material, whereby the liquid material becomes rigid in said sub region.

In the method step c1) the shape of a first surface of the liquid material is adjusted. The first surface may be adjacent to a fluid material. The shape of the first surface may be adjusted by means of controlling a contact angle of the liquid material with respect to structures delimiting the cavity. The shape of the first surface may be controlled by means of a continuous air stream, which locally applies pressure to the first surface.

In particular, the volume of the cavity is adjusted in method step c1). For example, the cavity is connected to a reservoir, which comprises the liquid material. When adjusting the shape of the first surface, the liquid material may flow between the reservoir and the cavity. The shape of the first surface may be adjusted by adjusting relative pressure between the liquid material and a fluid material which is adjacent to the first surface. The shape of the first surface may be adjusted by adjusting the volume of the cavity. In particular, the first/second membrane portion may have a non-uniform stiffness. In particular, the first/second membrane portion is shaped in an aspheric manner, when the shape of the first/second membrane portion is altered by means of a different pressure at opposite sides of the membrane. The stiffness of the first/second membrane portion may be anisotropic. In particular, the first/second membrane portion may have a non-uniform thickness, which results in the non-uniform stiffness of the first/second membrane portion.

In a method step d1) the liquid material is cured so that the liquid material becomes a rigid material and the first surface becomes a first interface, wherein the first interface has essentially the same shape as the first surface, which is defined in method step c1). Here and in the following, the rigid material has a minimum viscosity of 100000 mPa s, preferably a minimum viscosity of 1000000 mPa s, and highly preferred a minimum viscosity of 10000000 mPa s.

For example, the liquid material is cured by means of UV radiation, wherein the UV radiation is applied to subregions of the liquid material. The liquid material may be thermally curable, for example by cooling the liquid material bellow a melting temperature or by heating the liquid material above a curing temperature.

In particular, the subregions are exposed to the UV radiation successively.

In particular, the UV radiation is applied in such a way that during curing, an inclusion of liquid material in already cured rigid material is avoided. For example, a central sub region of the liquid material is exposed first and sub regions surrounding the central sub region are exposed successively. Advantageously mechanical stress, cracks and bubbles in the rigid material is reduced. For example, the UV radiation is applied starting from a center sub region, wherein the sub regions which are exposed subsequently are arranged radially around said center sub region. For example, the UV radiation is applied in a spot shape, wherein the diameter of the spot is increased successively. The spot shape, location and size may be controlled by means of a tunable optical component, like a tunable lens, a tunable mirror or a tunable prism.

The liquid material may be cured in a layered manner, wherein layers of the liquid material are cured subsequently. In particular the layers have a maim extension direction which is perpendicular with respect to the optical axis of the optical component. In particular, the layer comprising the first surface and/or second surface is the last layer to be cured.

In particular, the cavity comprises a compensation region or a compensation region is adjacent to the cavity. The compensation region is in liquid connection with the portion of the liquid material, which is cured during method step d1). The compensation region has a variable volume, so that changes in volume during the hardening of the liquid material in the cavity are compensated for by changes in the volume of the compensation region. In particular, the compensation region may be designed to be open to the surrounding environment, so that changes in volume in the compensation region are compensated for by ambient air flowing in the compensation region.

According to one embodiment, the shape of the first surface is altered while the liquid material is cured. For example, a first sub region of the liquid material is cured to become rigid material, wherein in other sub regions in the cavity the liquid material is not cured. A position of the rigid material in the cavity is manipulated to alter the shape of the first surface, before the further sub regions of the liquid material are cured. For example, after the first sub region is exposed to UV radiation, a pin pushes against the rigid material, to alter the position of the rigid material, whereby the shape of the first surface is altered.

In particular, a temperature of the solid state structures confining the cavity and/or the fluid material in the cavity is controlled. In particular, the curing of the liquid material may be locally initialized, delayed or accelerated by controlling the temperature of the liquid material in the cavity. In particular a temperature distribution in the liquid material is monitored during curing the liquid material in method step d1).

According to a first alternative in a method step e1) the optical component is fabricated by means of a molding process, wherein a molding tool comprises the rigid material. In particular, the molding tool defines the shape of the optical component, wherein the first interface defines the shape of an optical surface of the optical component. During the molding process the first interface is adjacent to the optical component which is fabricated. The first interface provides a counterpart of an optical surface of the optical component.

The rigid material may be non-transparent for electromagnetic radiation in the visible wavelength range. Advantageously, the rigid material may be optimized with respect to adhesive properties and mechanical properties, wherein optical properties of the rigid material may be neglected. Thus, method step e1) implies less restrictions on the material choice for the rigid material.

According to a second alternative in a method step e2) the optical component comprises the rigid material. In particular, the optical component consists of the rigid material. The first interface comprises an optical surface of the optical component. The optical component may be a refractive optical component, wherein the optical component is arranged to interact with light by providing the optical surface with a dedicated shape and a dedicated change of the refractive index. In particular, the rigid material is essentially transparent for said light. Alternatively, the optical component may be a reflective optical component, wherein the optical surface is arranged to reflect electromagnetic radiation of a dedicated wavelength range. In particular, a metallization may be applied to the first interface for providing the reflectivity of the optical surface. The metallization and the shape of the first interface may define the optical properties of the optical surface. In particular, the rigid material may be non-transparent for the electromagnetic radiation which is supposed to interact with the optical component.

According to one embodiment, in a method step f2), which is performed after method step d1), the rigid material is released from the cavity. In particular, the rigid material is pushed out of the cavity by means of increasing the pressure in the cavity and/or reducing the pressure in a region adjacent to the cavity.

In particular, the curing of the liquid material may be controlled such that after method step d1) a layer of liquid material is adjacent to the rigid material. In particular, such layer of liquid material may be arranged between solid state structures delimiting the cavity and the rigid material, which simplifies releasing the rigid material from the cavity. In particular, after curing in method step d1) the liquid material is removed from the cavity, preferably before the rigid material is released from the cavity.

The cavity may comprise an anti adhesion layer or a sacrificial layer, to simplify releasing the rigid material. In case, the cavity is delimited by means of a membrane portion, the membrane portion may be removed, dissolved or ruptured when the rigid material is released from the cavity.

According to one embodiment, the rigid material is post-processed in a method step f3) after method step d1). For example, the post-processing comprises at least one of:
- Exposing the rigid material to UV radiation;
- Tempering the rigid material;
- Coating the rigid material, with an antiscratch coating, an optical filter coating, an anti-reflective coating or a reflective coating;
- Exposing the rigid material to vacuum.

In particular, the post-processing may comprise processing the edge region of the rigid material. The edge region is the part of the rigid material defining the outer contour of the rigid material as seen in a top view onto the first interface. Processing the edge region may comprise additive processes, like coating, blackening the edge region. Processing the edge region may comprise conversion processes oxidizing or plasma treating the edge region. Processing the edge region may comprise subtractive processes, in which parts of the rigid material are removed, for example by means of etching, milling, punching or cutting.

According to one embodiment
- in method step a1) the at least one cavity (2) is delimited on a first side by a surface (3a) of a first membrane portion (3), wherein a shape of the first membrane portion (3) is adjustable;
- in method step b1) the liquid material (4) is filled into the at least one cavity (2), such that the liquid material (4) contacts the surface (3a) of the first membrane portion (3);
- in method step c1) the shape of the first surface (4a) of the liquid material is adjusted by adjusting the shape of the first membrane portion (3).

According to one embodiment, the method for producing at least one optical component, comprises the steps of:
- a1) Providing at least one cavity, wherein the at least one cavity is delimited on at least a first side by a surface of a first membrane portion, wherein a shape (and/or a position) of the first membrane portion is adjustable (for example by forming the first membrane into a desired shape);
- b1) Filling a liquid material into the at least one cavity for forming at least one optical component, wherein the liquid material contacts a first surface of the first membrane portion;
- c1) Adjusting the shape of the first membrane portion;
- d1) Curing the liquid material filled into the at least one cavity so that the cured liquid material forms a first interface of the at least one optical component, which first interface comprises a shape defined by a shape of the first surface of the first membrane portion.

According to a preferred embodiment, the at least one optical component is a lens and the optical surface is a refractive surface of the lens. Particularly, the first interface can form a first optical surface of the at least one optical component. However, the actual first optical surface of the at least one optical component can also be formed by a coating or a layer arranged on the first interface. Particularly, the first membrane portion can remain on the rigid material. In this case the first membrane portion preferably has the same refractive index as the cured rigid material.

Preferably, according to a further embodiment, the rigid material is transparent when it is cured. Furthermore, preferably, the liquid material is initially in a liquid state when it is filled into the at least one cavity.

Furthermore, according to an embodiment of the method, in step a), the at least one cavity is formed by an opening formed in a mask, wherein the first membrane portion is connected to the mask and covers said opening so as to delimit the at least one cavity on said first side.

According to an embodiment, the opening of the mask comprises one of: a circular contour, a non-circular contour, an elliptic contour, a polygonal contour.

Furthermore, according to an embodiment, the contour of the opening defines a contour of the at least one optical component (e.g. of the lens). In particular, the diameter of the opening may be less than 10 mm, preferably less than 5 mm.

Furthermore, according to an embodiment, the mask forms a lateral wall of the at least one cavity.

According to a further embodiment of the method, the mask comprises at least one channel (or a plurality of channels) through which the at least one cavity is filled with the liquid material in step b1).

Furthermore, according to an embodiment of the method according to the present application, the mask carries the at least one optical component after curing of the liquid material.

According to one embodiment the method comprises the method step e1), wherein adhesion of the optical component to the first interface is reduced by means of a coating applied onto the first interface or the membrane which is arranged between the first interface and the optical component or by means of a nano-structure formed by means of the first interface. According to one embodiment, the method comprises method step e2), wherein reflection of light in the visible wavelength range at the first interface is reduced by means of a coating applied onto the first interface or the membrane or by means of a nano-structure formed by means of the first interface.

Furthermore, in an embodiment after curing of the liquid material in step d1), the first membrane portion is at least partially or completely removed from the mask and the first interface is coated and/or forms a first optical surface of the at least one optical component. In an alternative embodiment, after curing of the liquid material, the first membrane portion stays on the cured material (i.e. on said first interface) and is coated and/or forms a first optical surface of the at least one optical component.

This means that the first interface can form the final first optical interface or that the final first optical surface is formed by a layer (e.g. coating) arranged on the first interface. Particularly the first optical surface can be formed by the first membrane portion or layer (e.g. coating) arranged thereon.

Particularly, a partial removal of the first membrane portion can mean that only a layer (e.g. a carrying layer, see e.g. below) of the first membrane portion is removed and another layer (e.g. layer) of the first membrane portion remains on the first interface.

Furthermore, particularly for providing said at least one channel (or a plurality of channels) for filing said liquid material into the at least one cavity, the mask comprises a first and a second part, wherein the at least one channel is formed between the first and the second part. Particularly, the first and the second part of the mask can each be formed as a plate, which plates are brought in direct contact with each other or are brought in close proximity to one another to form the respective channel. Particularly, the first and the second part have a main extension direction extending essentially parallel to the first membrane. Particularly, for separation of the at least one optical component in step d), the two parts (e.g. plates) can be taken apart from one another.

Furthermore, according to a preferred embodiment of the method according to the present invention, the mask is flexible. With the mask being flexible it can be easily deformed to bring the first membrane portion into a desired shape to adjust said surface of the first membrane portion and therewith the first interface (particularly first optical interface) of the at least one optical component that is to be produced using the method according to the present invention.

According to a further embodiment of the method, the opening of the mask is surrounded by a transparent circumferential portion of the mask, particularly so as to define a lateral surface of the at least one optical component (e.g. lens) when the liquid material has been cured (e.g. in step d)).

According to an embodiment the method comprises method step e2) and an optical element is provided in step a) on a side of the mask that faces away from the first surface. In particular the optical element is provided in step a) on a side of the mask that faces away from the first membrane portion so that particularly the at least one cavity is arranged between the first membrane portion and the optical element.

Particularly, in an embodiment, the optical element comprises a refractive index that is equal to the refractive index of the rigid material. Preferably, according to an embodiment, the optical element and the rigid material comprise the same material.

Preferably, the optical element is bonded to rigid material when the liquid material is cured (e.g. in step d1))

Furthermore, according to an embodiment, the optical element comprises a curved optical surface facing away from the liquid material filled into the at least one cavity.

According to a further embodiment of the method comprising method step e2), in method step a1), the at least one cavity is delimited on a second side opposing said first side by a surface of a second membrane portion, wherein a shape (and/or position) of the second membrane portion is adjustable (for example by forming the second membrane portion into a desired shape). Thus, the second membrane portion enables to adjust the shape of a second interface (e.g. optical surface) of the at least one optical component.

Furthermore, according to said embodiment, method step b1) further comprises filling the liquid material into the at least one cavity, so that the liquid material also contacts the surface of the second membrane portion.

Further, according to said embodiment, method step c1) further comprises adjusting the shape of the second membrane portion.

Furthermore, according to said embodiment, step d1) further comprises curing the liquid material filled into the at least one cavity so that the liquid material forms a second interface (e.g. optical surface) of the at least one optical component, which second interface comprises a shape defined by the adjusted shape of the surface of the second membrane portion.

According to one embodiment of the method comprising method step e2), step a1) further comprises providing a carrier. The carrier may be part of the solid state structure confining the cavity.

In particular, method step d1) further comprises removing the carrier from the at least one optical component after curing of the liquid material.

According to an alternative embodiment of the method, the carrier forms a mount for the at least one optical component after curing of the liquid material in step d1).

According to a preferred embodiment, the carrier is a printed circuit board. This is advantageous since the optical component can be directly positioned with respect to a further component on the printed circuit board that is operatively interacting with the optical component.

Preferably, according to a further embodiment, the carrier comprises at least one opening that may be aligned with the first surface, in particular with the first membrane portion, and the at least one cavity, wherein in step b1) the liquid material is preferably also filled into the at least one opening for connecting the at least one optical component in a form-fitting manner to the carrier when the liquid material is cured. In particular, step d1) further comprises curing the liquid material filled into the at least one cavity and the at least one opening of the carrier to connect the at least one optical component in a form-fitting manner to the carrier.

Advantageously, according to a further embodiment, the at least one opening of the carrier is used as an aperture of the at least one optical component.

In an alternative embodiment, instead of an opening in the carrier, the carrier can be a transparent carrier. The transparent carrier may comprise glass or a polymer; preferably the transparent carrier comprises the same material as the rigid material. The carrier comprises a first side facing the liquid material which is filled into the cavity in method step b1) and a second side facing away from the first side of the carrier. Particularly the second side of the carrier faces the second membrane portion (see also below).

Particularly, the transparent carrier is continuous, and the transparent carrier separates the at least one cavity into a first region extending away from the carrier starting from the first side and a second region extending away from the carrier starting from the second side. In particular, the first region is arranged between the first membrane portion and the first side of the carrier and the second region is arranged between said second membrane portion and the second side of the carrier.

Furthermore, in this respect, step b1) comprises filling the liquid material into the first region of the at least one cavity so that the liquid material also contacts the first side of the carrier.

Particularly, according to said embodiment, step d1) further comprises curing the liquid material filled into the first region of the at least one cavity so that the rigid material is bonded to the first side of the carrier.

Particularly, applying the liquid material on both sides of the carrier and adjusting the shape of the first and second surface, in particular adjusting the first and second membrane portions, as well as curing the liquid material on both sides of the carrier can be performed in independent process steps, i.e., in steps b1), c1) and d1) the liquid material on the first side of the carrier is processed, whereas the liquid material on the second side of the carrier can be processed in further steps b2), c2) and d2), i.e., in a corresponding embodiment, the method comprises the further steps of:
  b2) filling the liquid material into the second region of the at least one cavity so that the liquid material contacts the second side of the carrier, in particular a surface of the second membrane portion;
  c2) adjusting the shape of the second surface of the liquid material in the second region;
  d2) curing the material filled into the second region at least one cavity so that the liquid material becomes a rigid material and the second surface becomes a second interface, wherein a shape of the second interface is defined by the shape of the second surface, and so that the rigid material is bonded to the second side of the carrier. In particular, the second interface forms an optical surface of the at least one optical component. The second interface may comprise a shape defined by the adjusted shape of the surface of the second membrane portion.

Furthermore, according to an embodiment, the first membrane portion comprises an anti-reflective surface (AR surface). According to an embodiment, the AR surface is arranged on a side of the first membrane portion facing away from said rigid material of the at least one optical component.

According to an alternative embodiment, the first membrane portion comprises a surface structure, particularly a nano-structure arranged on a side of the first membrane portion facing said rigid material of the at least one optical component. Particularly, the surface structure causes the first optical surface to be an anti-reflection first optical surface when the first membrane portion is removed from the cured liquid material.

According to an alternative embodiment, the first membrane portion comprises an anti-reflective layer (AR layer) arranged on a side of a carrying layer of the first membrane portion facing said liquid/rigid material of the at least one optical component, wherein the AR layer comprises a refractive index between the refractive index of the rigid material and the refractive index of air, wherein after curing of the liquid material, the carrying layer of the first membrane portion is removed and the AR layer remains on the cured material, in particular on the at least one optical component.

According to a preferred embodiment, the AR layer comprises a nano-structure. The respective nano-structure can be a moth-eye antireflective structure, i.e., an array comprising a plurality of protuberances, each protuberance having a dimension smaller than the wavelength of the light incident upon it. The protuberances form a region of graded refractive index at the interface between two media, substantially reducing the amount of light reflected by the interface.

Particularly, in the same fashion, the second membrane portion can comprise an AR layer, which can be formed in analogy to the embodiments described with respect to the first membrane portion.

Furthermore, according to an embodiment, the first membrane portion can comprise a scratch resistant layer on a side facing away from the rigid material of the at least one optical component. Here, particularly, the first membrane portion remains on the first interface and particularly forms the first optical surface.

Furthermore, according to an alternative embodiment, the first membrane portion may comprise a scratch resistant layer arranged on a side of a carrying layer of the first membrane portion that faces the cured material. Here, particularly, after curing of the liquid material, the carrying layer of the first membrane portion is removed and the scratch resistant layer remains on the first interface and particularly forms the first optical surface.

The second membrane portion can be used in an analogous fashion in order to generate a scratch resistant layer of the second optical surface.

Particularly, in all embodiments, the liquid material is filled into the at least one cavity (particularly into the first and/or second region of the at least one cavity) in a liquid state.

Furthermore, according to a preferred embodiment, step b) of the method further comprises degassing of the liquid material after filling of the liquid material into the at least one cavity (particularly after filling the liquid material into the first and/or second region of the at least one cavity).

The liquid material may be degassed, in particular after filling the liquid material into the cavity. The liquid material may be degassed by reducing the pressure of the liquid material, for example, by reducing the pressure of the adjacent fluid material. In particular, a cavity is arranged to apply ultrasound to the liquid material for degassing. The gas separating from the liquid material during degassing the liquid material may be trapped in a dedicated region of the cavity. In particular, gravitational forces and/or centrifugal forces may be utilized to move the gas to the dedicated region. The gas separating from the liquid material may be moved to the dedicated region by means of a continuous flow of the liquid material in the cavity. Alternatively, the gas separating from the liquid material during degassing may be removed from the cavity. For example, the gas separating from the liquid may leave the cavity at the further side which is open.

Regarding the adjustment of the shape of the respective membrane portion that is used to define the shape of the respective interface/optical surface of the at least one optical component, different techniques can be used according to the present invention. Particularly, method step c1) and/or c2) comprises at least one of:

deforming the mask (particularly, deforming the mask allows to adjust astigmatism and prism of the at least one optical component);

applying pressure to the mask in several spots of the mask simultaneously;

adjusting a pressure of the liquid material and/or an ambient pressure outside the at least one cavity;

sucking or pressing the first membrane portion into a molding tool and/or sucking or pressing the second membrane portion into a molding tool;

pushing a master against the first membrane portion and/or pushing a master against the second membrane portion [the master can be formed by a glass member, particularly a flat master (e.g. a flat glass member) is pushed against the first membrane portion to tilt the first membrane portion for forming the at least one optical component into a prism;

changing a distance between the first and the second part of the mask;

changing a distance between the first membrane portion and the second membrane portion rotating the liquid material so that the shape of the first and/or second (4b) surface is at least partially defined by a centrifugal force applied to the liquid material.

According to a further embodiment, in method step c1), c2), d1) and/or d2) a shape of the first and/or second surface is measured. In particular, a shape of the first membrane portion is measured (e.g. in reflection mode or in transmission mode) upon adjusting the shape of the surface of the first membrane portion. Accordingly, a shape of the second membrane portion can be measured (e.g. in reflection mode or in transmission mode), too.

A measurement unit may be arranged to measure the shape of the first and/or second surface. In particular, the shape of the first/second surface is adjusted by means of closed loop control. The measurement unit may comprise a Shack Hartmann Sensor. In particular, the Shack Hartmann Sensor may comprise a tunable optical component, like a tunable lens or a tunable prism for illuminating or imaging.

In particular, the measurement unit is arranged to measure a relative deviation of the shape of the first/second surface with respect to the shape of a reference lens. The measurement unit may comprise a single point system, which is arranged to measure a deflection of a single point of the first/second surface. In particular, the measurement unit may be arranged to generate a point cloud of the deflection of the first/second surface. For example, the measurement unit comprises a projector, which is arranged to project a grid pattern on the first/second surface, wherein the measurement unit is arranged to determine the shape of the first/second surface by imaging the projected grid pattern.

According to yet a further preferred embodiment of the method according to the present invention, the shape of the first surface (4a) and/or the second surface (4b) is adjusted iteratively. In particular, the shape of the first and the second surface is measured and adjusted simultaneously or in an alternating fashion. Further, according to an embodiment, the shape of the first and the second membrane portion is adjusted iteratively, wherein the shape of the first and the second membrane portion is measured and adjusted simultaneously or in an alternating fashion.

Particularly, according to an embodiment, the first and/or second interface (e.g. optical surface) of the at least one optical component can be measured before curing the liquid material.

Furthermore, according to a preferred embodiment of the method according to the present invention, the liquid material is irradiated with UV light (e.g. in step d1) or d2)) for curing the liquid material.

Particularly, in an embodiment, the mask may be arranged to block some of the UV light, whereby the mask defines a contour of the at least one optical component. Particularly, the mask may define a non-circular contour of the at least one optical component. Furthermore, multiple optical components may be fabricated within the cavity simultaneously, wherein the mask may be arranged to shadow areas between adjacent optical components from UV radiation. Such structure of the mask simplifies separation of the plurality of optical components, because the liquid material between adjacent optical components remains liquid. Thus, after curing, the optical components (e.g. lenses) are not interconnected by rigid material. For example, for separation of the optical components, the excess liquid material can be rinsed.

Furthermore, according to an embodiment, the UV-light is radiated such that it impinges uniformly (particularly collimated) onto the liquid material filled into the at least one cavity.

Particularly, in an embodiment, to avoid inhomogeneous curing caused by a curvature of the first surface, in particular the first membrane portion, a transition liquid is arranged on top of the first membrane portion, which transition liquid comprises a refractive index that is equal to the refractive index of the liquid material, in particular of said rigid material of the at least one optical component. Thereby, refraction of the UV light is avoided when being transmitted from the transition liquid to said liquid material.

According to an embodiment of the method, sub regions of the liquid material of the at least one optical component are cured consecutively.

According to an embodiment, the liquid material may be cured consecutively from opposing sides of the at least one cavity.

Particularly, according to an embodiment, the liquid material comprises first and second sub regions, wherein the first subregions are cured first to become fixpoints, and wherein the second subregions are cured afterwards, wherein the second subregions are adjacent to first subregions.

For example, in an embodiment, the at least one optical component is a lens array comprising a plurality of lenses, wherein the edges (forming the first sub regions) of the lens array are cured first and afterwards the lenses (forming the second sub regions) of the lens array are cured.

Furthermore, according to an embodiment, the UV-light is radiated through an aperture, wherein a diameter of the aperture is changed during the curing of the liquid material of the at least one optical component.

Furthermore, according to an embodiment, the shape of the first surface, in particular the first membrane portion, and/or of the second surface, in particular the second membrane portion, may be altered during the curing process, wherein different subregions of the liquid material of the at least one optical component are cured consecutively According to a further embodiment, the liquid material is cured by means of a light beam (in particular laser beam), which comprises a diameter smaller than the diameter of the at least one optical component, wherein the light beam scans the first surface to cure the liquid material. Likewise, in an embodiment, such light beam may scan the second surface.

Furthermore, according to an embodiment, the UV light for curing the liquid material of the at least one optical component is patterned UV light. Particularly, in an embodiment. The UV light is patterned by a liquid-crystal display (LCD) projector or a digital light processing (DLP) projector.

According to an alternative embodiment, for curing the liquid material (e.g. in step d1) or d2), the liquid material of the at least one optical component is heated.

Furthermore, according to an embodiment of the method, the mask is removed after curing of the liquid material of the at least one optical component.

Particularly, in an embodiment, the first and/or second membrane portion is/are removed from the rigid material. Particularly. the first and/or second membrane portion may be removed by peeling.

Further, in an embodiment, after curing of the liquid material of the at least one optical component, the first membrane portion is at least partially or completely removed and the first interface is coated and/or forms a first optical surface of the at least one optical component. Alternatively, after curing of the liquid material, the first membrane portion remains on the rigid material and is coated and/or forms a first optical surface of the at least one optical component.

According to a further embodiment, after curing of the liquid material of the at least one optical component, the second membrane portion is at least partially or completely removed and the second interface is coated and/or forms a second optical surface of the at least one optical component. Alternatively, after curing of the liquid material of the at least one optical component, the second membrane portion remains on the cured liquid material and is coated and/or forms a second optical surface of the at least one optical component.

Particularly, in this context by a partial removal of the respective membrane portion can mean that only a layer (e.g. a carrying layer, see e.g. below) of the respective membrane is removed and another layer (e.g. layer) of the respective membrane portion remains on the first interface.

Furthermore, in an embodiment, an AR layer, e.g. coating (see also above), which is arranged between a carrying layer of the first membrane portion and the rigid material can remain on the first interface. Likewise, an AR layer, e.g.

coating (see also above), which is arranged between a carrying layer of the second membrane portion and the rigid material may remain on the second interface of the at least one optical component.

According to a further embodiment, the method is for producing a plurality of optical components.

To this end, in method step a1) a plurality of cavities is provided. Each cavity of said plurality of cavities may be delimited on at least one side by means of a surface of an (e.g. flexible) first membrane portion, wherein a shape of the respective first membrane portion is adjustable (for example by forming the respective first membrane portion into a desired shape).

In method step b1) each cavity of said plurality of cavities is filled with the liquid material, wherein for each of the plurality of cavities the liquid material forms a first surface respectively. In particular, in each cavity an optical component is formed. For example, the liquid material contacts a surface of the respective first membrane portion.

In method step c1) the shape of the first surfaces is adjusted, in particular by adjusting the shape of the first membrane portion.

In method step d1) the liquid material is cured so that the liquid material becomes rigid material and the first surfaces become the first interfaces (e.g. optical surface), wherein the shape of the first interfaces is defined by the adjusted shape of the first surfaces respectively.

Particularly, all embodiments described herein can comprise forming a plurality of optical components instead of at least one optical component. The mask may comprise a corresponding number of openings as well as first membrane portions and particularly also second membrane portions.

Particularly, according to an embodiment of the method, the respective cavity of said plurality of cavities is formed by an opening formed in the mask, wherein the respective first membrane portion is connected to the mask and covers the respective opening so as to delimit the respective cavity on said at least one side.

In case more than one cavity is present, each first membrane portion can be formed by a separate (e.g. flexible) first membrane. However, the first membrane portions may alternatively from integral portions of a single (e.g. flexible) first membrane. The same holds for the second membrane portions, i.e., the second membrane portions can each be formed by a separate (e.g. flexible) second membrane or may alternatively form integral portions of a single (e.g. flexible) second membrane.

According to an embodiment, regarding step a1), the respective cavity is delimited on a second side opposing said first side by a second membrane portion, wherein a shape (and/or position) of the respective second membrane portion is adjustable (for example by forming the respective second membrane portion into a desired shape).

Particularly, in an embodiment, step b1) further comprises filling the liquid material into the respective cavity, so that the liquid material also contacts the surface of the respective second membrane portion;

Furthermore, in an embodiment, step c1) further comprises adjusting the shape of the respective second membrane portion.

Further, according to an embodiment, step d1) further comprises curing the liquid material filled into the respective cavity so that the liquid material forms a second interface (e.g. optical surface), which respective second interface comprises a shape defined by the adjusted shape of the surface of the respective second membrane portion.

Also in case of several cavities and/or several first membrane portions and particularly second membrane portions, the respective membrane portion can be removed after curing of the liquid material or can stay on the respective interface as described above, so that the respective optical surface is either formed by the interface (or by a layer/coating arranged thereon) or by the respective membrane portion (or by a layer/coating arranged thereon) as described above with respect to the first/second membrane portion.

According to a preferred embodiment, the optical components are connected to one another and form an array of optical components, wherein particularly each of the optical components is a lens (i.e. the array of optical components is a lens array).

Particularly, excess liquid material between adjacent optical components is removed after curing of the liquid material.

According to a further embodiment, in a method step f1) the individual optical components (particularly lenses) are cut out of the array, particularly by means of at least one of: milling, laser cutting, stamping, cutting, punching. The method step f1) is performed after method step d1). In particular, the method step f1) comprises method steps f2) and/or method step f3).

According to one embodiment, the method comprises method step e2) and additional method steps b2), c2) and d2), wherein an additional interface is fabricated, which forms an additional optical surface of the optical component. In particular, the method steps b2), c2) and d2) may be repeated multiple times to form multiple additional interfaces, wherein each additional interface may have an individual shape. Rigid materials, which are formed in a subsequent manner, are adjacent to one another and have different refractive indices. Thereby, the additional interfaces from refractive surfaces on the optical component respectively.

In the method step b2) an additional liquid material is filled into the at least one cavity, wherein the additional liquid material is adjacent to the interface which was fabricated in the preceding method step d1) or d2). In case multiple iterations of the method steps b2), c2) and d2) are performed, the additional liquid material is adjacent to the interface which is fabricated in the preceding iteration respectively.

In the method step c2) a shape of the additional surface is adjusted, wherein the additional surface (4c) is arranged on a side of the additional liquid material opposing the interface (40a) which was fabricated in the preceding method step d1) or d2).

In the method step d2) the additional liquid material is cured so that the additional liquid material becomes an additional rigid material and the additional surface (4c) becomes the additional interface (40c), wherein a shape of the additional interface (40c) is defined by the shape of the additional surface (4c). The method steps b2), c2) and d2) are performed after method step d1).

The rigid material and additional rigid material(s) may from a refractive optical component which may be an achromat, an apochromat or a super achromat. In particular, the rigid material and the additional rigid material have different Abbe Numbers and different refractive indices. In particular, the rigid material and the additional rigid material(s) are firmly bonded in a form fitting manner at the interface or additional interface. Thus, the optical component comprises the rigid material and the additional rigid material, which are formed in a one-piece manner.

Advantageously, the present invention can be used to create blanks for spectacles, augmented and virtual reality headsets, endoscopes, camera lenses and any spherical and none spherical lens, prisms, and any other optical component.

Yet another aspect of the present invention relates to an optical device comprising at least one optical component (or a plurality of optical components) produced with the method according to the present invention.

A further aspect of the present invention relates to an optical device, comprising:
- a rigid material,
- a component embedded at least partially in the rigid material wherein the optical device comprises at least one optical surface configured to influence an interaction of light with said component in a pre-defined manner, wherein the at least one optical surface is formed by one of: the rigid material, a layer arranged on the rigid material (e.g. anti-reflective and/or scratch resistant), a membrane portion arranged on the rigid material.

Particularly also the membrane portion can comprise such a layer or any other coating.

According to a preferred embodiment of this optical device, said component is completely embedded in the rigid material so that the latter covers the component on all sides of the component.

According to a further embodiment, the embedded component is one of: an electronic component; an optical component, a diffraction grating, an optical aperture, a filter, an optoelectronic component, a piece of jewelry, a sensor, a light source.

According to yet another embodiment of the optical device, the at least one optical surface is formed in a liquid state of the rigid material.

According to yet another aspect of the present invention, a device for producing at least one optical component is disclosed, the device comprising:
- at least one cavity (2) for receiving a liquid curable material (4),
- an actuator unit for defining a shape of a first surface (4a) of the liquid curable material (4) in the cavity (2), and
- a curing unit (102) for curing the liquid material (4), while the liquid material is in the at least on cavity (2).

According to one embodiment of the device for producing at least one optical component comprises
- a mask comprising an opening,
- a first membrane portion being connected to the mask and covering the opening to delimit said at least one cavity at least on a first side, wherein the first membrane portion comprises a surface for defining a shape of a first interface (e.g. optical surface) of the at least one optical component to be produced, when the liquid material is filled into the at least one cavity and contacts said surface of the first membrane portion,
- an actuator unit configured to adjust the shape of the first membrane portion to adjust the shape of the interface of the at least one optical component, and
- a curing unit for curing the liquid material when the latter has been filled into the at least on cavity.

According to an embodiment of the device, the curing unit may be a UV light source configured to emit UV light or a heater configured to heat the liquid material in the cavity or a chilling unit configured to cool the liquid material.

According to a further embodiment of the device, the device may comprise a mount configured to carry the at least one cavity that is limited on at least one side by means of the first membrane portion.

According to yet another embodiment of the device, the device comprises a filling unit configured to fill the at least one cavity with said liquid material.

Further features and advantages of the present inventions as well as embodiments of the present invention shall be described in the following with reference to the Figures, wherein FIG. 1 shows a schematical illustration of an embodiment of the method according to the present invention for producing an optical component having a customized optical surface;

FIG. 10 shows a further embodiment of the method according to the present invention for producing an optical component forming a prism;

FIGS. 11-12 show a top view (FIG. 11) and a cross-sectional view of a device for conducting the method according the present invention;

Figure 1:
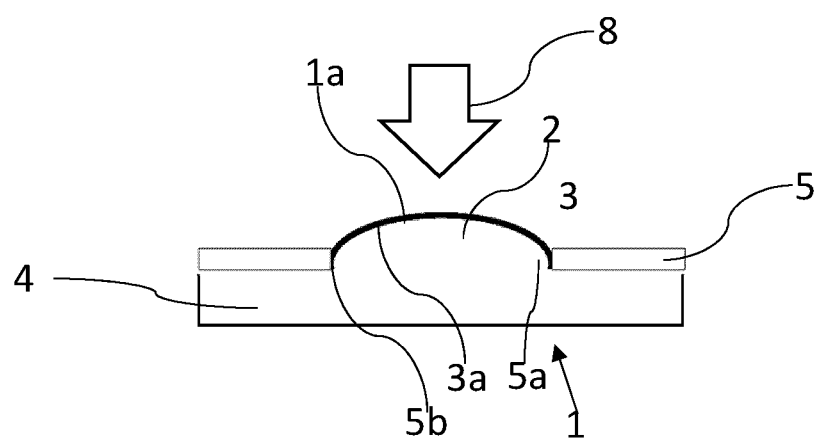

FIG. 1 shows the general concept of the method according to the present invention. The method uses a cavity 2 that is delimited on one side by a first membrane portion 3. The first membrane portion 3 comprises a surface 3a that will be contacted by liquid material 4 that is filled into the cavity 2. With the material being in a liquid state, the membrane 3 is adjusted to form e.g. a convex lens surface. The liquid material 4 filled into the cavity 2 can then be cured by means of either heat 8 or UV light 8 depending on the liquid material 4. The optical component 1 then comprises an interface 1a, here in form of an optical surface 1a, that comprises a shape that corresponds to the shape of the surface 3a of the first membrane portion 3. Generally, the actual optical surface can be formed by the interface 1a, but may also be formed by a layer (e.g. coating) arranged on the interface 1a. Particularly, the first membrane portion 3 can remain on the cured material 4/interface 1a and may then form the actual optical surface. Also, here, the first membrane portion 3 may be further processed for forming an optical surface using the first membrane portion 3 as a basis.

Particularly, generally, the curable liquid material can be a UV curable polymer that is preferably transparent for visible light.

Particularly, the cavity 2 can be formed by an opening 5a formed into a mask 5 that forms a lateral wall 5b of the cavity 2 and therewith defines a lateral contour of the optical component 1 to be produced. The opening 5a is covered by the preferably flexible first membrane portion 3 to delimit the cavity 2 and retain the liquid/rigid material 4 in the cavity 2.

Figure 2:
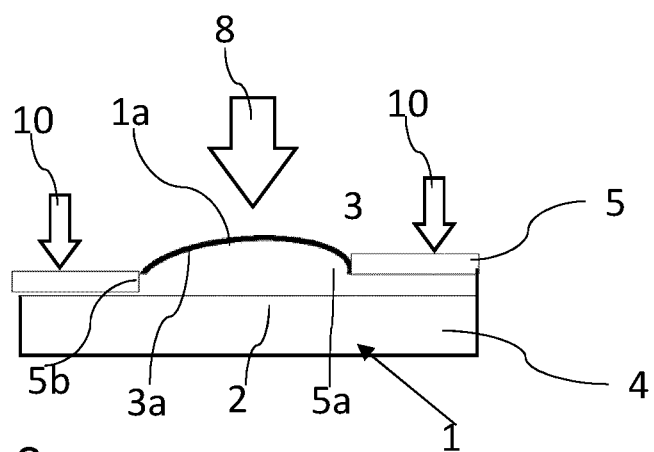
FIG. 2 shows an embodiment of adjusting the membrane portion for shaping the optical surface.

For adjusting the shape of the surface 3a and therewith of the optical surface 1a, forces 10 can be applied to the flexible mask 5, wherein said forces particularly extend along an optical axis that runs perpendicular to the mask 5. FIG. 2 shows an example where the optical surface 1a gets a convex shape by applying forces 10 on either side of the opening 5a of the mask 5. The forces can be different, e.g. to also form the optical component into a prism.

Figure 3:
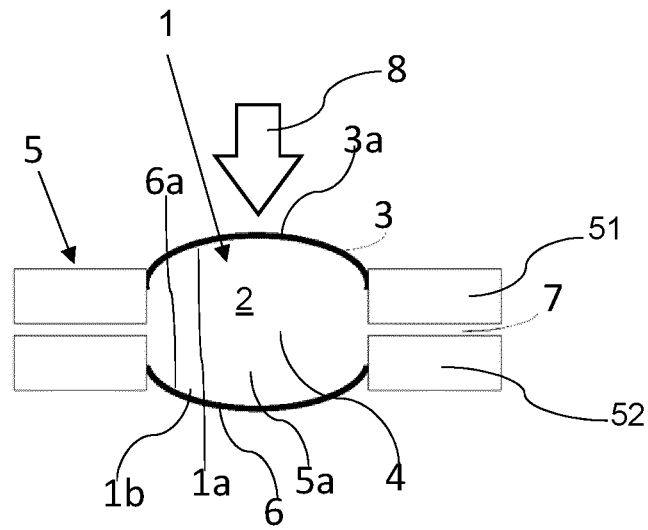
FIG. 3 shows a further embodiment of the method according to the present invention using a mask having a channel for applying the liquid material for forming the optical component(s)

FIG. 3 shows a modification of the embodiment shown in FIGS. 1 and 2, wherein here the mask 5 comprises at least one channel 7 for filling the cavity 2 of the mask with the liquid material.

Particularly, the mask 5 can comprise a first and a second part 51, 52 that are stacked on top of one another and together form the at least one channel 7 in the stacked configuration of the parts 51, 52 shown in FIG. 3. However, the channel 7 can also be formed in other ways.

Again, the cavity 2 can be formed by an opening 5a of the mask 5, which opening 5a is here delimited on two opposing sides by a flexible first membrane portion 3 and a flexible second membrane portion 6.

Using such a configuration of the mask 5 allows to generate an optical component 1 having two opposing optical surfaces 1a, 1b that can be shaped depending on the shape of the surface 3a, 6a of the respective membrane portion 3, 6 that is contacted by the liquid material 4 when the latter is filled through the at least one channel 7 into the cavity 2.

Once the surfaces 3a, 6a are shaped as desired, the liquid material in the cavity 2 can be cured to form the optical component 1 (here e.g. a bi-convex lens 1).

In FIGS. 1 to 3 only a single cavity 2 is shown. However, the method also comprises embodiments using multiple such cavities 2 arranged side by side so that multiple optical components 1 can be formed in parallel. Eventually, the optical components 1 can be separated from one another to form individual optical devices 1. Alternatively, the optical components 1 can also be maintained in the interconnected configuration form an optical device in form of an array of connected optical devices 1 such a lens array.

Figure 4:
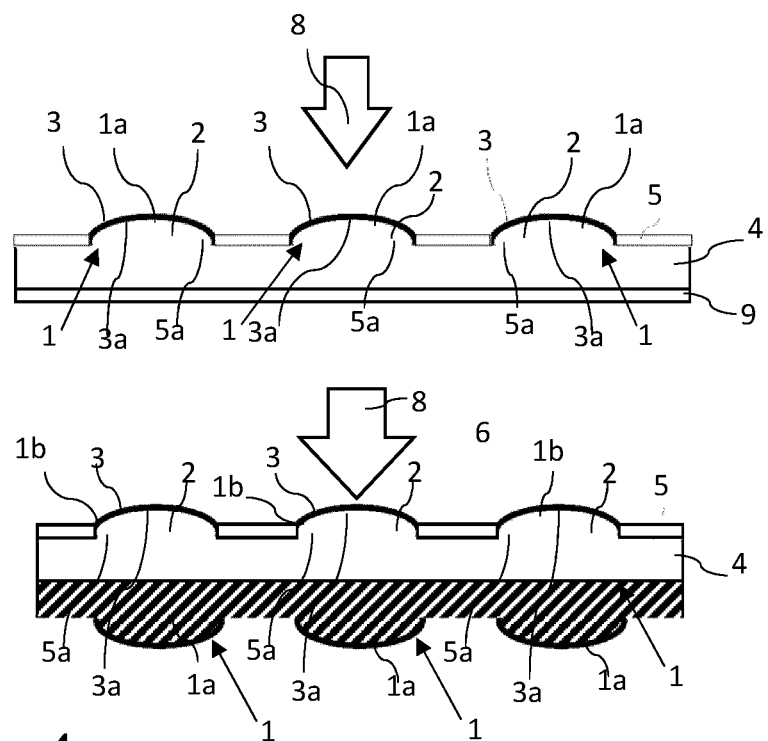
FIG. 4 shows a further embodiment of the method according to the present invention using a carrier for delimiting the cavities used for forming the optical components in a two-step curing process.

The production of such a lens array comprised of multiple optical components 1 in a two-step process is shown for example in FIG. 4.

Here, the mask 5 comprises multiple openings 5a, wherein each opening 5a frames a flexible first membrane portion 3. The first membrane portions 3 may extend continuously between the mask 5 and the cavities 2. Alternatively, each opening 5a may be sealed by means of a separate first membrane portion 3.

Particularly, the interconnected optical components 1 can be cured in two steps. In a first step the cavities 2 are delimited by means of the mask 5 and the membrane portions 3 on one side and by carrier 9 arranged opposite the mask 5 and membrane portions 3 as shown in the upper part of FIG. 4. After having shaped the surfaces 3a as desired, the interconnected cavities 2 are filled with the liquid material 4. Then, after a first curing step resulting in a first half of the final array of optical components 1, said cured half is flipped and the carrier 9 is removed. During a second step, the cured half now delimits the cavities 2 instead of the carrier. The cavities 2 being delimited by the cured half of the array of optical components 1 and a mask 5 with membrane portions 3 are filled in turn with the liquid material 4 which then bonds to the already cured half upon curing of the material 4. This results in an array of optical components 1, here in the form of bi-convex lenses. However, arrays of other optical components 1 can be formed in this fashion as well.

Figure 5:
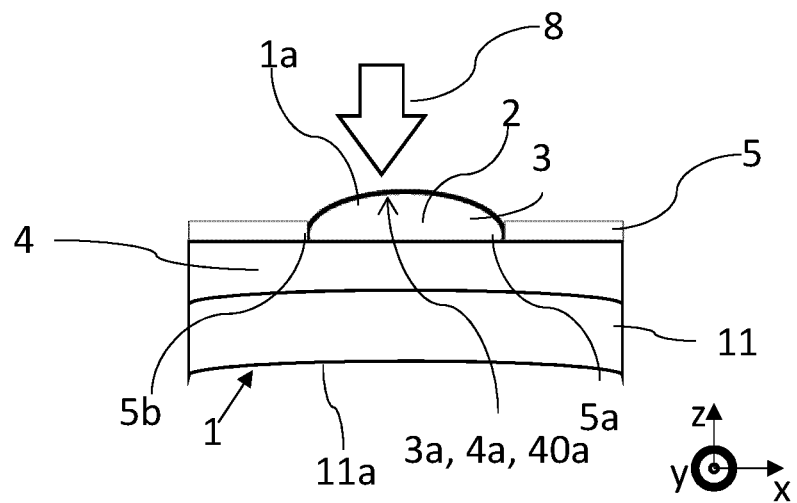
FIG. 5 shows a further embodiment of the method according to the present invention using an optical element to which the rigid material is bonded upon curing.

FIG. 5 shows another variant of the method according to the present invention. Here an e.g. blank optical element 11 which delimits the cavity (or cavities) 2 on a side opposing the first membrane portion 3. The optical element 11 is being bonded to the rigid material 4 during curing. In particular, the rigid material 4 and the optical element 11 may have the same refractive index. Further, optical element 11 may have a concave or convex surface 11a facing away from the rigid material 4.

In particular, after curing the liquid material 4, the thickness along a z-direction of the rigid material 40 is smaller than the thickness along a z-direction of the optical element. For example, the optical element is selected such, that a deviation between the shape of the first surface 4a and the surface of the optical element 11 facing the rigid material 40 is minimized. In particular, the rigid material 40 has a non-uniform thickness, wherein the thickness is measured along the z-direction. For example, the minimal thickness of the rigid material along the z-direction is at most 0.5 mm, preferably at most 0.1 mm, highly preferred at most 0.05 mm.

Figure 6:
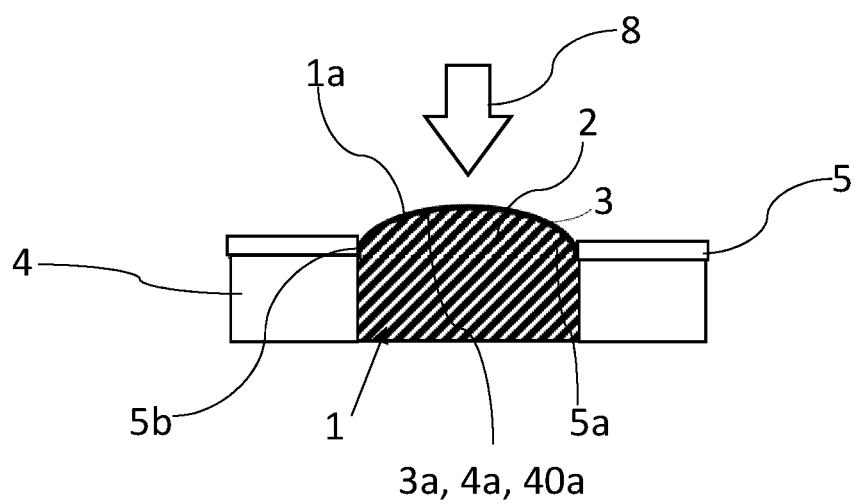
FIG. 6 shows a further embodiment of the method according to the present invention using an optical element to which the rigid material is bonded upon curing.

According to yet another embodiment shown in FIG. 6, the mask 5 can be made of an opaque material. Thus, the mask 5 defines the contour of the portion of the liquid material, which is being cured by means of UV light 8 or heat 8 as indicated in FIG. 6.

Figure 7:
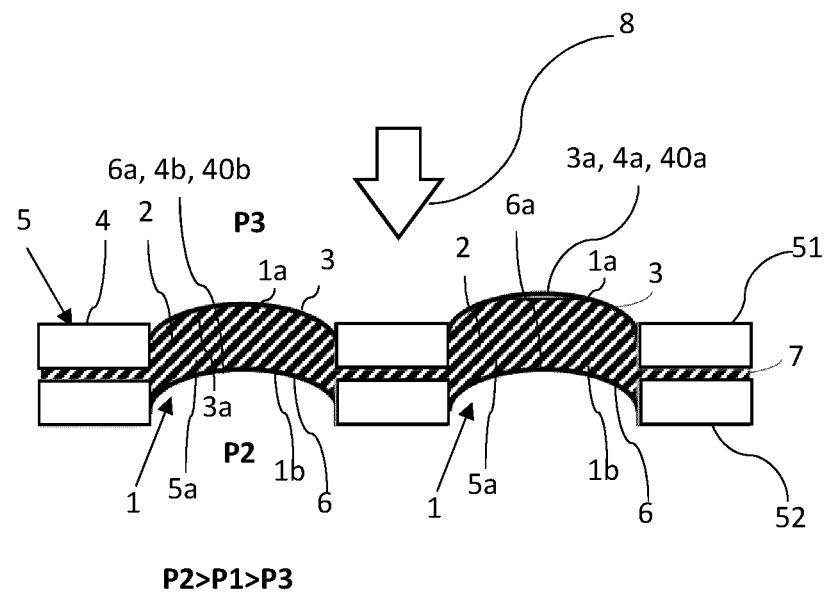
FIG. 7 shows a further embodiment of the method according to the present invention, wherein the optical surfaces of the optical components are shaped by adjusting a pressure P1 of the liquid material in relation to an ambient pressure P2, P3.

FIG. 7 shows a further possibility of shaping the surfaces 3a, 6a of the membrane portions 3, 6 in order to shape the final optical surfaces 1a, 1b of the optical components 1 produced with the method. Particularly, the embodiment shown in FIG. 7 uses the configuration shown in FIG. 3 albeit with multiple interconnected cavities 2 that are arranged side by side in the lateral direction.

In order to adjust the shapes of the first and second membrane portion 3, 6 the pressure P1 of the liquid material 4 filled into the cavities 2 is adjusted such in relation to the ambient pressures P1, P2 on either side of the mask 5 that the shapes of the first and second membrane portions 3, 6 result in convex and concave optical components/lenses 1. However, depending on the pressures P1, P2, P3 also other surface shapes 1a, 1b can be easily generated.

Figure 8:
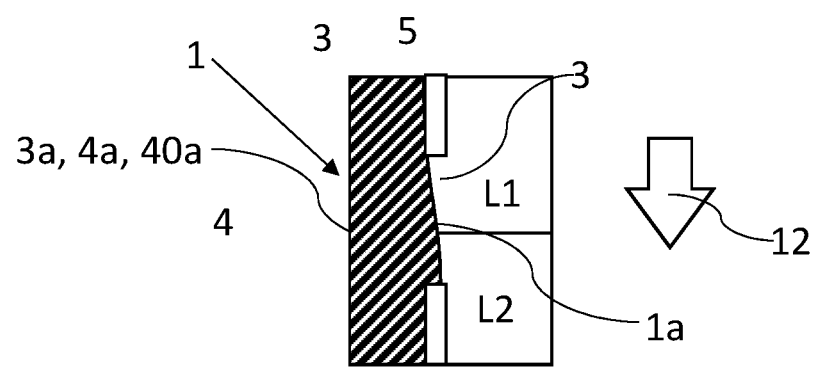
FIG. 8 shows a further embodiment of the method according to the present invention, wherein the optical surfaces of the optical components are shaped with help of shaping liquids L1, L2 affected by gravity.

Furthermore, FIG. 8 shows an embodiment, in which the shape of the first membrane portion(s) 3 is adjusted by means of two shaping liquids L1, L2. The ratio of the densities of the shaping liquids L1, L2 with respect to each other and with respect to the liquid material 4 as well as the level of the liquids L1, L2 is chosen such that a desired shape of the first membrane portion(s) result, as indicated in FIG. 8.

Figure 9:
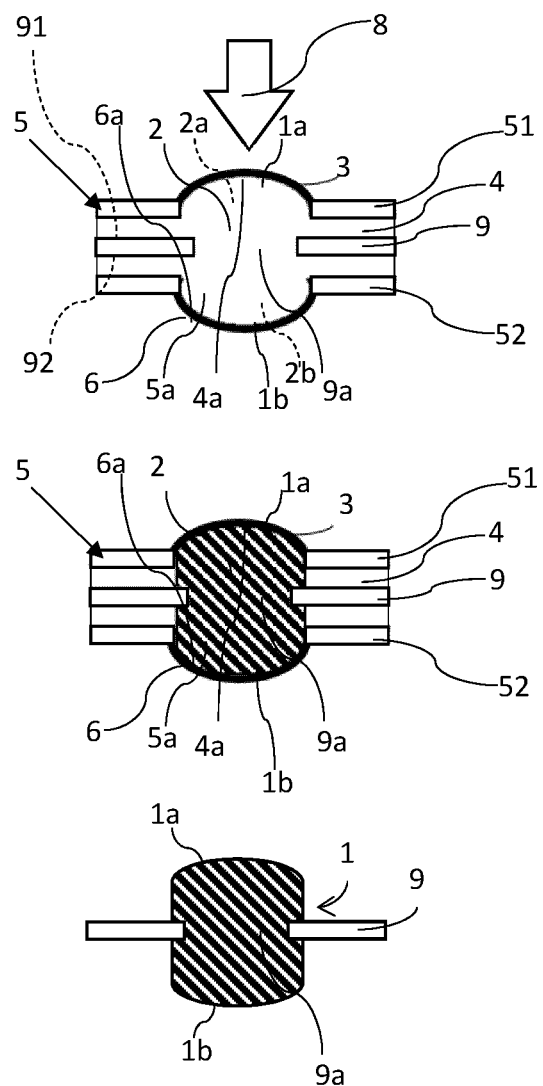
FIG. 9 shows a further embodiment of the method according to the present invention using a carrier to which the rigid material is bonded upon curing, wherein the carrier forms an aperture of the optical component.

FIG. 9 shows yet another embodiment of the method according to the present invention. Here, a carrier 9 is arranged in the cavity 2. Particularly, the carrier 9 can be a printed circuit board (PCB). The carrier 9 comprises an opening 9a that is aligned with two opposing membrane portions 3, 6, i.e. first membrane portion 3 and second membrane portion 6, so that the opening 9a eventually forms an aperture of the optical component 1 to be produced.

Particularly, after having adjusted the shapes of the membrane portions 3, 6 as desired, the liquid material 4 is arranged in the opening 9a as well as above and below the carrier 9 (upper part of FIG. 9). For curing of the liquid material 4, the liquid material 4 is preferably exposed to the UV light 8 from both sides to avoid shadowing of the liquid material 4 by the carrier 9.

After the liquid material 4 is cured (middle part of FIG. 9), the mask 5 and non-cured liquid material 4 is removed. In particular, the membrane portions 3, 6 are removed. Due to the opening 9a being filled with the material 4, the optical component 1 can be connected to the carrier in a formfitting manner (cf. lower part of FIG. 9). In particular, the carrier 9 may comprise light emitting and/or detecting elements. The light emitting and/or detecting elements may be embedded by the cured material 4. In particular, the optical component 1 may be part of a gas sensor.

Furthermore, instead of providing an opening 9a, the carrier 9 may also be continuous but transparent. The carrier 9 then divides the cavity 2 into a first and a second region 2a, 2b. Here, the liquid material can be processed independently on either side of the carrier 2. For instance, after having adjusted the shape of the first membrane portion 3, liquid material 4 can be filled into the first region 2a of the cavity 2 between the first membrane portion 3 and the first side 91 of the carrier 9 and can then be cured to form the first optical surface 1a of the optical component 1. In another step, after having adjusted the shape of the second membrane portion 6, liquid material 4 can be filled into the second region 2b of the cavity 2 between the second membrane portion 6 and the second side 92 of the carrier 9 and can then be cured to form the second optical surface 1b of the optical component 1.

Using the method according to the present invention, also an optical component in form of a prism or comprising a prism can be generated as shown in FIG. 10.

Here, the first membrane portion 3 can also be made out of a stiff material. The tilt of the first membrane portion 3 can be adjusted by applying a force to the mask 5 and particularly by adjusting the pressure of the liquid material versus the environment. The liquid material may be cured by means of UV light 8 shining through the first membrane portion 3. In the framework of the present invention, the tilted position of the first membrane portion 3 is also considered to be a shape of the first membrane portion 3.

Particularly, the method according to the present invention can be performed by using a device 100 of the kind shown in FIGS. 11 and 12 in an exemplary fashion. This device 100 can be easily adapted to the individual embodiments a1 already described above.

Particularly, the device 100 comprises a mask 5 (see also above) which comprises at least one opening 5a with a first membrane portion 3 covering the opening 5a. The mask 5 and the first membrane portion 3 delimit a cavity 2 at least on one side. A filling unit is arranged to fill the cavity 2 with the liquid material 4.

Particularly, the device comprises an actuator unit 101 that can comprise multiple actuators 103, which can be arranged circumferentially around the first membrane portion 3. Particularly, the actuators 103 are configured to apply a force along the z-axis (e.g. optical axis) onto the mask 5. Thereby, the position of the mask 5 along the z-axis is adjusted. For example, the device 100 comprises at least four actuators 103, preferably at least eight actuators 103. Preferably, the actuators 103 are equidistantly spaced along the periphery of the first membrane portion 3 (or along the opening 5a). By adjusting the position of the mask 5 along the z-axis, the shape of the first membrane portion is adjusted which in turn determines the final shape of an optical surface 1a of an optical component 1 that is produced by the device 100 due to the fact that the liquid material 4 will contact the surface 3a of the first membrane portion 3 and will therefore assume the shape of the surface 3a of the first membrane portion 3.

Furthermore, the device preferably comprises a curing unit 102 such as a UV light for generating UV light 8 (or alternatively a heater for heating the liquid material 4). The curing unit 102 is arranged to cure the liquid material 4 as e.g. shown in FIG. 12, after the shape of the first membrane portion 3 has been adjusted by means of the actuators 103.

The method according to the present invention enables a cost-efficient and fast production of customized optical surfaces having a high optical quality.

Figure 13:
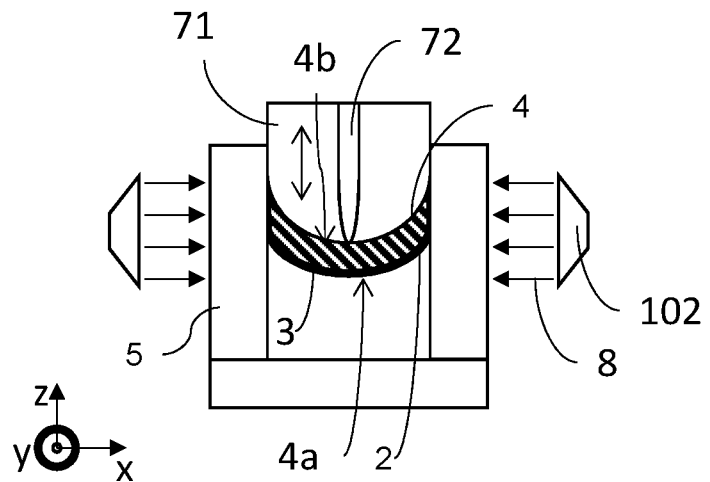
FIG. 13 shows an exemplary embodiment of a method for producing at least one optical component in a schematic sectional view, wherein a shape of a first surface is defined by means of a piston.

FIG. 13 shows an exemplary embodiment of a method for producing at least one optical component in a schematic sectional view, wherein a shape of a first surface 4a is defined by means of a piston 71. The piston 71 and the first membrane portion 3 delimit the cavity 2, which is provided in method step a1), at two opposing sides. The mask 5 delimits the cavity 2 laterally.

In method step b1), the liquid material 4 may be filled into the cavity 2 through an injection port 72. The injection port 72 is integrally formed within the piston.

The first surface 4a of the liquid material 4 is adjacent to the first membrane portion. In method step c1) the shape of the first surface 4a of the liquid material 4 is adjusted by altering the pressure in the cavity 2. The pressure may be altered by moving the piston towards or away from the first membrane portion 3 and/or by filling more or less liquid material 4 into the cavity through the injection port 72.

In particular, the shape of the second surface 4b is defined by the shape of the piston 71. The piston 71 may comprise a rigid lens having a shape which forms a counterpart of the desired shape of the second surface 4b. In particular, the rigid lens of the piston 71 may be fabricated according to method steps a1), b1), c1), d1) and e1).

In method step d1), the liquid material 4 is cured so that the liquid material 4 becomes a rigid material 40 and the first surface 4a becomes a first interface 40a, wherein a shape of the first interface 40a is defined by the shape of the first surface 4a. The liquid material is cured by means of UV radiation 8, which is emitted by means of a curing unit 102, and which enters the cavity through the mask 5, which is transparent for UV radiation 8.

In a subsequent method step the at least one optical component may be formed by means of a molding process, wherein the first interface 40a provides at least one surface of a molding tool and the shape of an optical surface of the optical component 1 is formed by means of the first interface 40a.

Alternatively to method step e1), in a method step e2 the optical component comprises the rigid material 40 and the first interface 40a is an optical surface of the optical component 1.

Figure 14A:
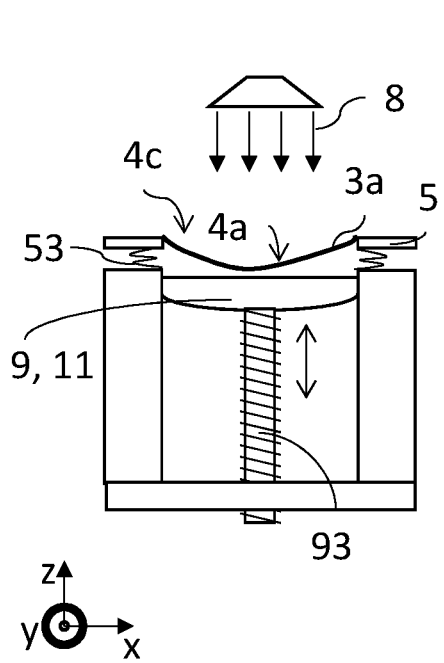
FIGS. 14a and 14b show an exemplary embodiment of a method for producing at least one optical component in a schematic sectional view, wherein additional interfaces are fabricated.
Figure 14B:
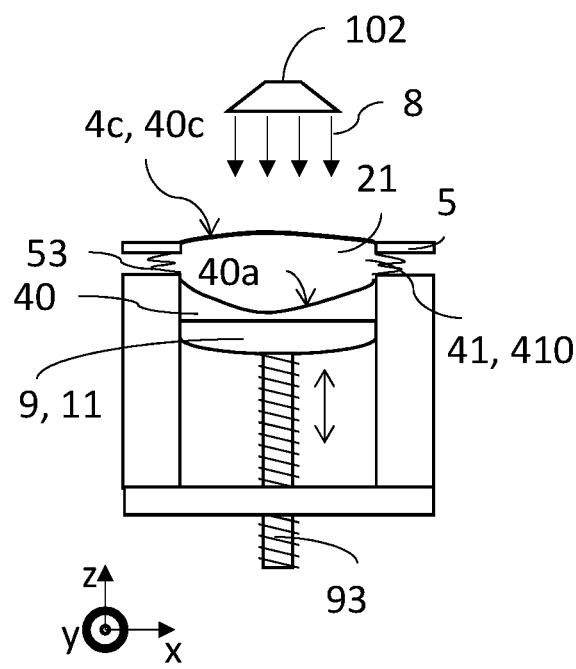

FIGS. 14a and 14b show an exemplary embodiment of a method for producing at least one optical component in a schematic sectional view, wherein additional interfaces 4c are fabricated.

As shown in FIG. 14a, in method step a1) the cavity 2 is provided. The cavity 2 is delimited by the first membrane portion 3 and by the carrier 9 on opposing sides. In particular, the carrier 9 may be an on optical element 11, like a lens, having a curved surface. Alternatively, the carrier 9 may be a flat transparent carrier. The mask 5 delimits the cavity 2 laterally. The mask 5 comprises a bellows 53, which delimits the cavity laterally. The mask 5 may be moved along a z-direction, to adjust the shape of the first membrane portion 3. The mask 5, in particular the bellows 53, provides a flexible, and in particular liquid tight, connection between side wall 54 and the first membrane portion 3a.

The sidewall 54 surrounds the carrier 9 circumferentially in lateral directions (direction along the x-y-plane). The carrier is movable along the z-direction. In particular, the carrier is mounted on a positioning unit 93 which is arranged to move the carrier 9 along the z-axis. The position unknit may comprise a thread, which allows to adjust the position of the carrier 9.

In a method step b1) the liquid material 4 is filled into the cavity 2. In a method step c1), the shape of the first surface 4a of the liquid material 4 is adjusted. In this particular embodiment, the first surface 4a is concavely shaped. The shape may be adjusted by altering the relative pressure between cavity 2 and the region at a side opposed to the cavity with respect to the first membrane 3. Alternatively, the shape may be adjusted by moving the mask 5 along the z-direction. Moreover, the shape of the first membrane portion 3a may be adjusted by moving the carrier 9 along the z-direction.

In a method step d1) the liquid material 4 is cured, so that the liquid material 4 becomes a rigid material 40 and the first surface 4a becomes a first interface 40a, wherein the shape of the first interface 40a is defined by the shape of the first surface 4a.

After the method step d1), the position of the carrier 9 is adjusted along the z-direction, wherein the rigid material remains in contact with the carrier 9. Thus, an additional region 21 is generated in the cavity 2, which additional region 21 is delimited on one side by the first interface 40a.

As shown in FIG. 14b, in subsequent method steps b2), c2) and d2) an additional interface 40c is fabricated. As shown in FIG. 14b, in a method step b2) an additional liquid material 41 is filled into the at least one cavity, in particular in the additional region 21, wherein the additional liquid 41 is adjacent to the interface 40a fabricated the preceding method step d1). In particular, the additional liquid 41 may be adjacent to the additional interface 40c fabricated in a preceding method step d2), if multiple additional interfaces 40c are fabricated.

In a method step c2) a shape of an additional surface 4c of the additional liquid material is adjusted. The additional surface 4c is arranged on a side of the additional liquid material 41 opposing the interface 40a, 40c which was fabricated in the preceding method step d1) or d2). The shape of the additional surface may be adjusted by the same means as in method step c1).

In a method step d2), the additional liquid material is cured so that the additional liquid material 41 becomes an additional rigid material 410 and the additional surface 4c becomes the additional interface 40c, wherein a shape of the additional interface 40c is defined by the shape of the additional surface 4c.

After performing at least one iteration of the method steps b2), c2) and d2), the optical component comprises the rigid material 40 and the additional rigid material 410. The first interface 40a and the additional interface(s) 40c are optical surfaces of the optical component. In particular, the rigid material and the additional rigid material have different refractive indices. The (additional) rigid materials 40a, 40c which are arranged adjacent to one another have different refractive indices, whereby the additional interface(s) 40c form refractive interfaces. In particular, the optical component is an achromat or an apochromat.

Figure 15:
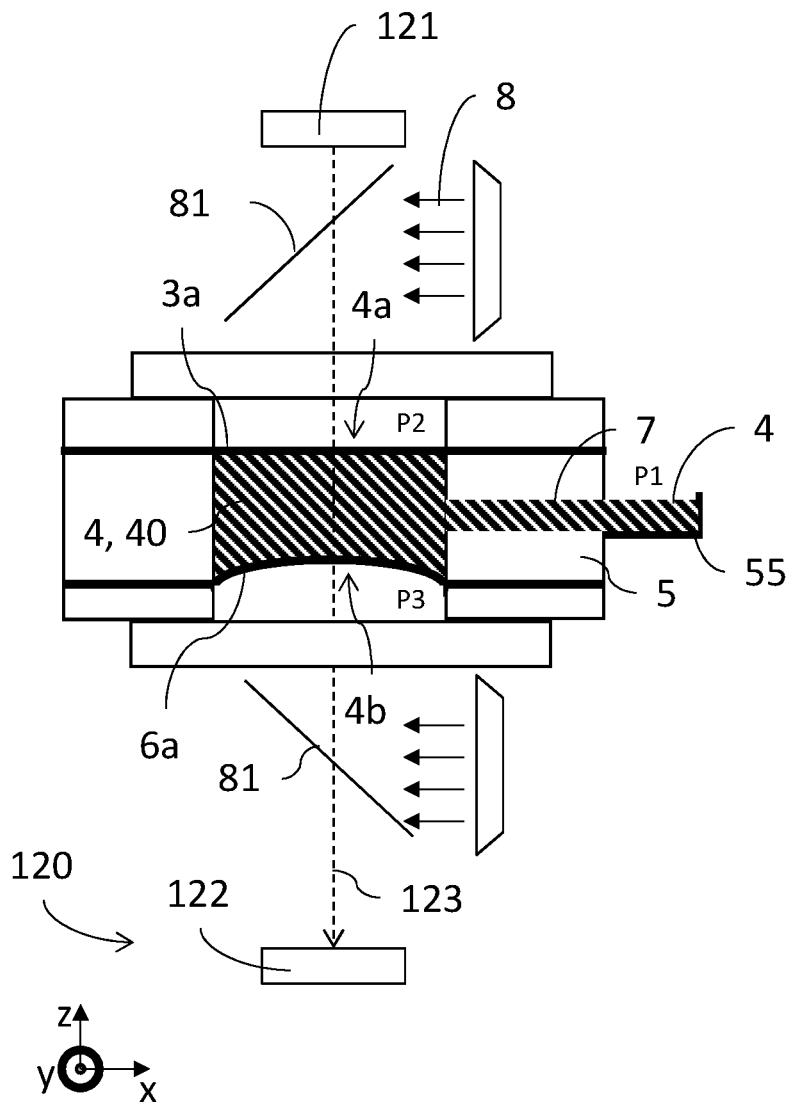
FIG. 15 shows an exemplary embodiment of a method for producing at least one optical component in a schematic sectional view, wherein the shape of a first and/or second surface is measured by means of a measurement unit.

FIG. 15 shows an exemplary embodiment of a method for producing at least one optical component in a schematic sectional view, wherein the shape of a first 4a and/or second 4b surface is measured by means of a measurement unit 120.

In a method step a1) the cavity 2 is provided, wherein the cavity is delimited by a first membrane portion 3 and a second membrane portion 6 on opposing sides of the cavity. The mask 5 delimits the cavity 2 laterally (along the X-Y-plane).

In a method step b1) the liquid material 4 is filled into the cavity 2 through a channel 7. The channel 7 connects the cavity 2 and a reservoir 55, which comprises the liquid material 4.

In a method step c1) a shape of the first surface 4a and the second surface 4b is adjusted. The shape of the first 4a and the second 4b surface is adjusted, by adjusting the relative pressure values between the cavity 2 and the regions adjacent to the first membrane portion 3 (pressure P2) and the second membrane portion 6 (pressure P3).

The channel 7 may remain open during method step c1), so that liquid material 4 may flow between the cavity 2 and the reservoir 55. In particular, the reservoir 55 and the cavity 55 are at the same pressure value P1. The reservoir 55 may be open, to be at ambient pressure. The ratio of P1 and P2 may be defined independently from the ratio of P1 and P3. The shape of the first surface may be controlled independently from the shape of the second surface by adjusting the pressure values P2 and P3, because the cavity 2 remains at a constant pressure value P1. Thus, a change in the shape of the first or second surface causes a flow of the liquid material through the channel 7. Advantageously, adjusting the shape of the first surface does not influence the shape of the second surface and vice versa.

The measurement unit is arranged to measure the shape of the first surface and the second surface by means of a measurement beam 123, which is transmitted through the first surface 4a and the second surface 4b. Alternatively, the measurement unit may be arranged to measure the shape of the first/second surface (4a, 4b) by means of reflection at the first and or second surface. In particular, the measurement unit 120 comprises a Shack Hartmann Sensor.

Figure 16:
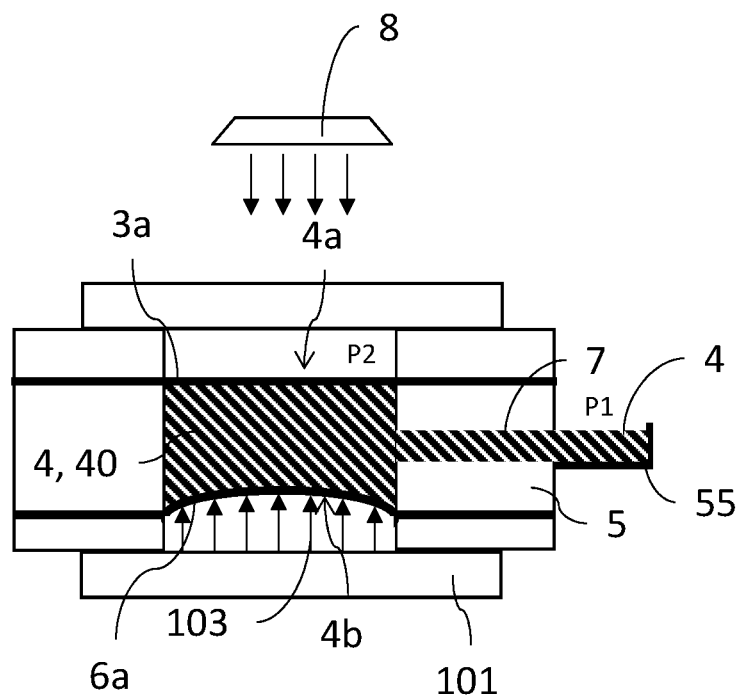
FIG. 16 shows an exemplary embodiment of a method for producing at least one optical component in a schematic sectional view, wherein a shape of a second surface is defined by means of an actuation unit 101.
Figure 16:
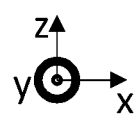

In a method step d1) the liquid material 4 is cured by means of UV radiation 8, so that the liquid material 4 becomes a rigid material 40 and the first surface 4a becomes a first interface 40a, and the second surface 4b becomes a second interface 40b. The UV radiation is directed towards the cavity by means of deflection mirrors 81, which may be transparent for the measurement beam. In particular, the measurement beam 120 and the UV-radiation 8 extend along a common optical path. FIG. 16 shows an exemplary embodiment of a method for producing at least one optical component in a schematic sectional view, wherein a shape of the second surface 4b is defined by means of an actuation unit 101. In particular, the actuation unit 101 is arranged to define a position along the z-axis of discrete points of the second surface 4b. The actuation unit 101 comprises multiple actuators 103, which are arranged to push against the second membrane portion 6. In particular, the actuators comprise pins which are in contact with the second membrane portion, wherein the position of the pins along the z-axis is adjustable. The actuators 103 for adjusting the position of the pins along the z-axis may be piezo actuators, voice coil actuators, electropermanent magnet actuators, stepper motors or hydraulic actuators.

The pressure P1 of the liquid material 4 remains constant during method step c1). In particular, the pressure P1 corresponds to ambient pressure. Thus, changing the shape of the second surface does not affect the shape of the first surface 4a. the shape of the first surface 4a is adjusted by adjusting the relative pressure between P1 and P2.

The invention claimed is:

1. A method for producing at least one optical component (1), comprising the steps of:
    a1) providing at least one cavity (2)
    b1) filling a liquid material (4) into the at least one cavity (2)
    c1) adjusting a shape of a first surface (4a) of the liquid material (4),
    d1) curing the liquid material (4) filled into the at least one cavity (2) so that the liquid material (4) becomes a rigid material (40) and the first surface (4a) becomes a first interface (40a), wherein a shape of the first interface (40a) is defined by the shape of the first surface (4a), and either
    e1) forming the at least one optical component by means of a molding process, wherein the first interface (40a) provides at least one surface of a molding tool and the shape of an optical surface of the optical component (1) is formed by means of the first interface (40a), wherein an optical element (11) is bonded to the optical component (1) on a side that faces away from the first interface (40a) or
    e2) the optical component comprises the rigid material (40) and the first interface (40a) is an optical surface of the optical component (1), wherein an optical element (11) is provided on a side of the cavity that faces away from the first surface (4a), and the optical element (11) is bonded to the rigid material (40) in method step d1).

2. The method according to claim 1, wherein
    in method step a1) the at least one cavity (2) is delimited on a first side by a surface (3a) of a first membrane portion (3), wherein a shape of the first membrane portion (3) is adjustable;
    in method step b1) the liquid material (4) is filled into the at least one cavity (2), such that the liquid material (4) contacts the surface (3a) of the first membrane portion (3);
    in method step c1) the shape of the first surface (4a) of the liquid material is adjusted by adjusting the shape of the first membrane portion (3).

3. The method according to claim 1, wherein the at least one optical component (1) is a lens and the optical surface is a refractive surface of the lens.

4. The method according to claim 1, wherein the method comprises the method step e1), wherein adhesion of the optical component to the first interface (40a) is reduced by means of a coating applied onto the first interface (40a) or the membrane (3) which is arranged between the first interface (40a) and the optical component (1) or a nanostructure formed by means of the first interface (40a).

5. The method according to claim 1, wherein the method comprises method step e2), wherein reflection of light in the visible wavelength range at the first interface (40a) is reduced by means of a coating applied onto the first interface (40a) or the membrane (3) or a nano-structure formed by means of the first interface.

6. The method according to claim 1, wherein method step c1) and/or method step c2) comprises at least one of:
    deforming the mask (5);
    applying pressure to the mask (5) in several spots of the mask simultaneously;
    adjusting a pressure (P1) of the liquid material (4) and/or an ambient pressure (P2, P3) outside the at least one cavity (2);
    sucking or pressing the first membrane portion (3) into a molding tool and/or sucking or pressing the second membrane portion (6) into a molding tool;
    pushing a master against the first membrane portion (3) and/or pushing a master against the second membrane portion (6);
    changing a distance between a first and a second part (51, 52) of the mask (5);
    changing a distance between the first membrane portion (3) and the second membrane portion (6);
    rotating the liquid material so that the shape of the first (4a) and/or second (4b) surface is at least partially defined by a centrifugal force applied to the liquid material (4).

7. The method according to claim 1, wherein in method step c1), c2), d1) and/or d2) a shape of the first (4a) and/or second (4b) surface is measured.

8. The method according to claim 1, wherein the shape of the first surface (4a) and/or the second surface (4b) is adjusted iteratively.

9. The method according to claim 1, wherein in method step d1) and or method step d2) the liquid material (4) is irradiated with UV light (8) for curing.

10. The method according to claim 1, wherein in method step d1) and/or method step d2) sub regions of the liquid material (4) of the at least one optical component (1) are cured consecutively.

11. The method according to claim 1, wherein in method step d1) and/or d2) the liquid material (4) is heated for curing.

12. The method according to claim 1 comprising the method step e2), wherein after method step d1),
    in a method step b2) an additional liquid material is filled into the at least one cavity, wherein the additional liquid is adjacent to the interface fabricated the preceding method step d1) or d2),
    in a method step c2) a shape of an additional surface (4c) is adjusted, wherein the additional surface (4c) is arranged on a side of the additional liquid material opposing the interface (40a) which was fabricated in the preceding method step d1) or d2), and
    in a method step d2) the additional liquid material is cured so that the additional liquid material becomes an additional rigid material and the additional surface (4c) becomes the additional interface (40c), wherein a shape of the additional interface (40*c*) is defined by the shape of the additional surface (4*c*).

13. The method according to claim 1, wherein
in method step a1) a plurality of cavities (2) is provided,
in method step b1) the plurality of cavities (2) is filled with the liquid material (4), wherein for each of the plurality of cavities (2) the liquid material (4) forms a first surface (4*a*) respectively;
in method step c1) the shape of the first surfaces (4*a*) is adjusted; and
in step d1) the liquid material (4) is cured so that the liquid material (4) becomes a rigid material (40) and the first surfaces (4*a*) become the first interfaces (40*a*), wherein a shape of the first interfaces (40*a*) is defined by the shape of the first surfaces (4*a*) respectively.

14. The method according to claim 13, wherein the optical component (1) is a lens array comprising a plurality of lenses, wherein each first interface (40*a*) defines the shape of a refractive surface of the lenses respectively.

15. The method according to claim 14, wherein excess material, particularly uncured liquid material (4), between adjacent lenses is removed after curing of the liquid material (4).

16. The method according to claim 15, wherein in a method step f1) the lenses of the lens array are separated by means of at least one of:
milling, laser cutting, stamping, cutting, punching, wherein
the method step f1) is performed after method step d1).

17. The method according to claim 1, wherein the at least one cavity (2) is formed by an opening (5*a*) formed in a mask (5), wherein the first membrane portion (3) is connected to the mask (5) and covers said opening (5*a*) so as to delimit the at least one cavity (2) on said first side.

18. The method according to claim 17, wherein the mask (5) comprises at least one channel (7) through which the at least one cavity (2) is filled with the liquid material (4).

19. The method according to claim 17, wherein after method step d1) the mask (3) carries the rigid material (40).

20. The method according to claim 17, wherein the mask (5) is removed after curing of the liquid material (4) of the at least one optical component (1).

21. The method according to claim 17, wherein the method comprises method step e2), and the optical element (11) is provided on a side of the mask (5) that faces away from the first surface (4*a*).

22. The method according to claim 21, wherein the optical element (11) comprises a refractive index that is essentially equal to the refractive index of the rigid material (40), and/or wherein the optical element (11) comprises the same material as the rigid material (40).

23. The method according to claim 21, wherein the optical element (11) comprises a curved optical surface (11*a*), and the curved optical surface (11*a*) faces away from the rigid material (40) filled into the at least one cavity (2).

24. A method for producing at least one optical component (1), comprising the steps of:
a1) providing at least one cavity (2), wherein the at least one cavity (2) is delimited on a second side opposing a first side by a surface (6*a*) of a second membrane portion (6), wherein a shape of the second membrane portion (6) is adjustable,
b1) filling a liquid material (4) into the at least one cavity (2), so that the liquid material (4) contacts the surface (6*a*) of the second membrane portion (6),
c1) adjusting a shape of a first surface (4*a*) of the liquid material (4) and adjusting the shape of the second membrane portion (6),
d1) curing the liquid material (4) filled into the at least one cavity (2) so that the liquid material becomes a rigid material (40) and the first surface (4*a*) becomes a first interface (40*a*), wherein a shape of the first interface (40*a*) is defined by the shape of the first surface (4*a*), and so that the liquid material forms a second interface (40*b*) of the at least one optical component (1), which second interface (40*b*) comprises a shape defined by a shape of the surface (6*a*) of the second membrane portion (6), and
e2) the optical component comprises the rigid material (40) and the first interface (40*a*) is an optical surface of the optical component (1).

25. A method for producing at least one optical component (1), comprising the steps of:
a1) providing at least one cavity (2) and a carrier (9), particularly for carrying the at least one optical component (1),
b1) filling a liquid material (4) into the at least one cavity (2),
c1) adjusting a shape of a first surface (4*a*) of the liquid material (4),
d1) curing the liquid material (4) filled into the at least one cavity (2) so that the liquid material (4) becomes a rigid material (40) and the first surface (4*a*) becomes a first interface (40*a*), wherein a shape of the first interface (40*a*) is defined by the shape of the first surface (4*a*), and either:
e1) forming the at least one optical component by means of a molding process, wherein the first interface (40*a*) provides at least one surface of a molding tool, the shape of an optical surface of the optical component (1) is formed by means of the first interface (40*a*), the carrier is fixedly attached to the optical component (1), and the carrier (90) forms a mount for the at least one optical component (1), or
e2) the optical component comprises the rigid material (40) and the first interface (40*a*) is an optical surface of the optical component (1), the carrier (9) is fixedly attached to the rigid material (40), and the carrier (90) forms a mount for the at least one optical component (1).

26. The method according to claim 25, wherein the carrier (9) is a printed circuit board.

27. The method according to claim 25, wherein the carrier (9) comprises at least one opening (9*a*), wherein the liquid material (4) is also filled into the at least one opening (9*a*) of the carrier (9) for connecting the at least one optical component (1) in a form-fitting manner to the carrier (9) in method step d1).

28. The method according to claim 27, wherein the at least one opening (9*a*) of the carrier (9) forms an aperture of the at least one optical component (1).

29. The method according to claim 25, wherein the carrier (9) is a transparent carrier comprising a first side (91) facing the liquid material (4) which is filled into the cavity in method step b1) and a second side (92) facing away from the first side of the carrier (9), wherein
the carrier (9) separates the at least one cavity (2) into a first region (2*a*) extending away from the carrier (9) starting from the first side (91) and a second region (2*b*) extending away from the carrier (9) starting from the second side (92), wherein step b1) further comprises filling the liquid material (4) into the at least one cavity (2) so that the liquid material (4) contacts the first side (91) of the carrier (9), and wherein step d1) further comprises curing the liquid material (4) in the first region (2*a*) so that the rigid material (40) is bonded to the first side (91) of the carrier (9).

30. The method according to claim 29, wherein the method comprises the further steps of:

b2) filling the liquid material (4) into the second region (2*b*) of the at least one cavity (2) so that the liquid material contacts the second side (92) of the carrier (9);

c2) adjusting the shape of a second surface (4*b*) of the liquid material (4) in the second region (2*b*);

d2) curing the liquid material (4) filled into the second region (2*b*) so that the liquid material (4) becomes a rigid material (40) and the second surface (4*b*) becomes a second interface (40*b*), wherein a shape of the second interface (40*b*) is defined by the shape of the second surface (4*b*), and so that the rigid material (4) is bonded to the second side (92) of the carrier (9), wherein method steps b2), c2) and d2) are performed after method step d1) in the order listed.

\* \* \* \* \*